US012340366B2

(12) United States Patent
Reineke et al.

(10) Patent No.: US 12,340,366 B2
(45) Date of Patent: Jun. 24, 2025

(54) METHOD AND SYSTEM OF NFT VALIDATION IN A BROKER MARKETPLACE

(71) Applicant: Dell Products L.P., Round Rock, TX (US)

(72) Inventors: Nicole Reineke, Northborough, MA (US); JoAnne Hubbard, Concord, MA (US); Hanna Yehuda, Acton, MA (US); Alan Sevajian, Salem, NH (US); Debra Arneson, Henniker, NH (US); Corinne Schulze, Hopkinton, MA (US); Robert Alan Barrett, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 354 days.

(21) Appl. No.: 17/659,758

(22) Filed: Apr. 19, 2022

(65) Prior Publication Data
US 2023/0334488 A1 Oct. 19, 2023

(51) Int. Cl.
*G06Q 20/40* (2012.01)
*G06Q 20/38* (2012.01)
*G06Q 40/04* (2012.01)
*H04L 9/00* (2022.01)

(52) U.S. Cl.
CPC ....... *G06Q 20/401* (2013.01); *G06Q 20/3827* (2013.01); *G06Q 40/04* (2013.01); *H04L 9/50* (2022.05); *G06Q 2220/00* (2013.01)

(58) Field of Classification Search
None
See application file for complete search history.

(56) References Cited

U.S. PATENT DOCUMENTS

| 11,991,078 B2* | 5/2024 | Simu | H04L 45/7453 |
| 2022/0215076 A1* | 7/2022 | Goldston | G06F 21/16 |
| 2023/0004627 A1* | 1/2023 | Holland | H04L 9/50 |
| 2023/0004970 A1* | 1/2023 | Jakobsson | G06Q 20/407 |

(Continued)

OTHER PUBLICATIONS

Benson; Yes, Your NFTs Can Go Missing—Here's What You Can Do About It; Mar. 19, 2021 https://decrypt.co/62037/missing-or-stolen-nfts-how-to-protect.

(Continued)

*Primary Examiner* — Jamie R Kucab
(74) *Attorney, Agent, or Firm* — Workman Nydegger

(57) ABSTRACT

Techniques for authenticating a digital asset represented by an NFT that is stored in a blockchain are disclosed. An NFT that has been minted for an asset is identified. The NFT was minted by generating metadata for the asset and by generating an original hash of the asset. The NFT is stored in a blockchain, and the metadata is stored in a centralized repository. The original hash is stored in either the repository or the blockchain. A potential transfer of the NFT is triggered. Triggering the potential transfer includes downloading, from the centralized repository, a local version of the asset. A local hash of the local version of the asset is generated. The local hash is compared against the original hash. If the two hashes are the same, then the transfer is permitted; otherwise, the transfer is not permitted.

18 Claims, 7 Drawing Sheets

(56) References Cited

U.S. PATENT DOCUMENTS

| | | | | |
|---|---|---|---|---|
| 2023/0177490 A1* | 6/2023 | Moore | ............... | G06Q 20/3827 |
| | | | | 705/66 |
| 2023/0198760 A1* | 6/2023 | Ferenczi | ............... | H04L 9/3247 |
| | | | | 713/168 |
| 2023/0205849 A1* | 6/2023 | Jackson | ................. | G06F 21/10 |
| | | | | 726/26 |
| 2023/0306088 A1* | 9/2023 | Holbrook | ................ | G06F 21/10 |
| 2024/0129493 A1* | 4/2024 | Emmanuel | ............ | H04L 1/0009 |

OTHER PUBLICATIONS

Rakesh; https://technastic.com/check-md5-checksum-hash; accessed Mar. 1, 2022.
https://github.com/microsoft/Azure-Non-Fungible-Token-Solution-Accelerator; accessed Mar. 1, 2022.
https://en.wikipedia.org/wiki/Non-fungible_token (accessed Dec. 12, 2024).

\* cited by examiner

METHOD AND SYSTEM OF NFT VALIDATION IN A BROKER MARKETPLACE

FIELD OF THE INVENTION

Embodiments of the present invention generally relate to data authentication. More particularly, at least some embodiments of the invention relate to systems, hardware, software, computer-readable media, and methods for authenticating a digital asset represented by a non-fungible token (NFT) stored in a decentralized blockchain.

BACKGROUND

In 2021, Jack Dorsey, the founder of Twitter, announced that he was going to sell Twitter's first ever tweet, which simply read: "just setting up my twttr." That tweet eventually sold for $2.9 million. That tweet, which had existed for nearly 15 years, did not have any monetary value until a non-fungible token (NFT) for the tweet was created.

An NFT cannot be duplicated, and it acts as a digital certificate to verify the ownership of a digital asset. NFTs can be created for any type of digital asset, including text, videos, images, gifs, and so on. The NFT resides on a blockchain and includes a smart contract, which is a tool designed to manage a sale agreement between a current owner and a potential future owner.

When an NFT is minted (i.e. created), the NFT is configured to store metadata about a digital "asset" or digital "content." The NFT is stored in the blockchain, but the metadata is typically stored elsewhere, such as a centralized repository or perhaps a decentralized storage system (e.g., perhaps another blockchain). The primary reason for storing the metadata and asset off of the blockchain is to avoid hosting potentially large files on the blockchain. Having large files stored natively on the blockchain can result in numerous technical (e.g., data storage issues) and even financial hardships. For instance, an estimate was recently released stating that storing about 1 GB of data on the blockchain can cost about $75.75 million (as of November 2021).

The NFT includes a universal resource locator (URL) that points to the metadata. The metadata includes details about the asset for which the NFT was generated. As examples only, the metadata can include information about who created the asset, a description of the asset, the date when the NFT was created, ownership and pricing information for the asset, a transaction history for the asset, and so on.

Problems have arisen as a result of the asset and metadata being stored separately from the NFT. That is, while the URL in the NFT is immutable in the blockchain, the metadata and perhaps even the asset itself is not immutable. As a part of a data marketplace, it is desirable to have a solution that enables the confirmation of ownership as well as proof of content of the asset that is being purchased. What is needed, therefore, is an improved technique for managing NFTs and their corresponding metadata and assets.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION

Figure 1:
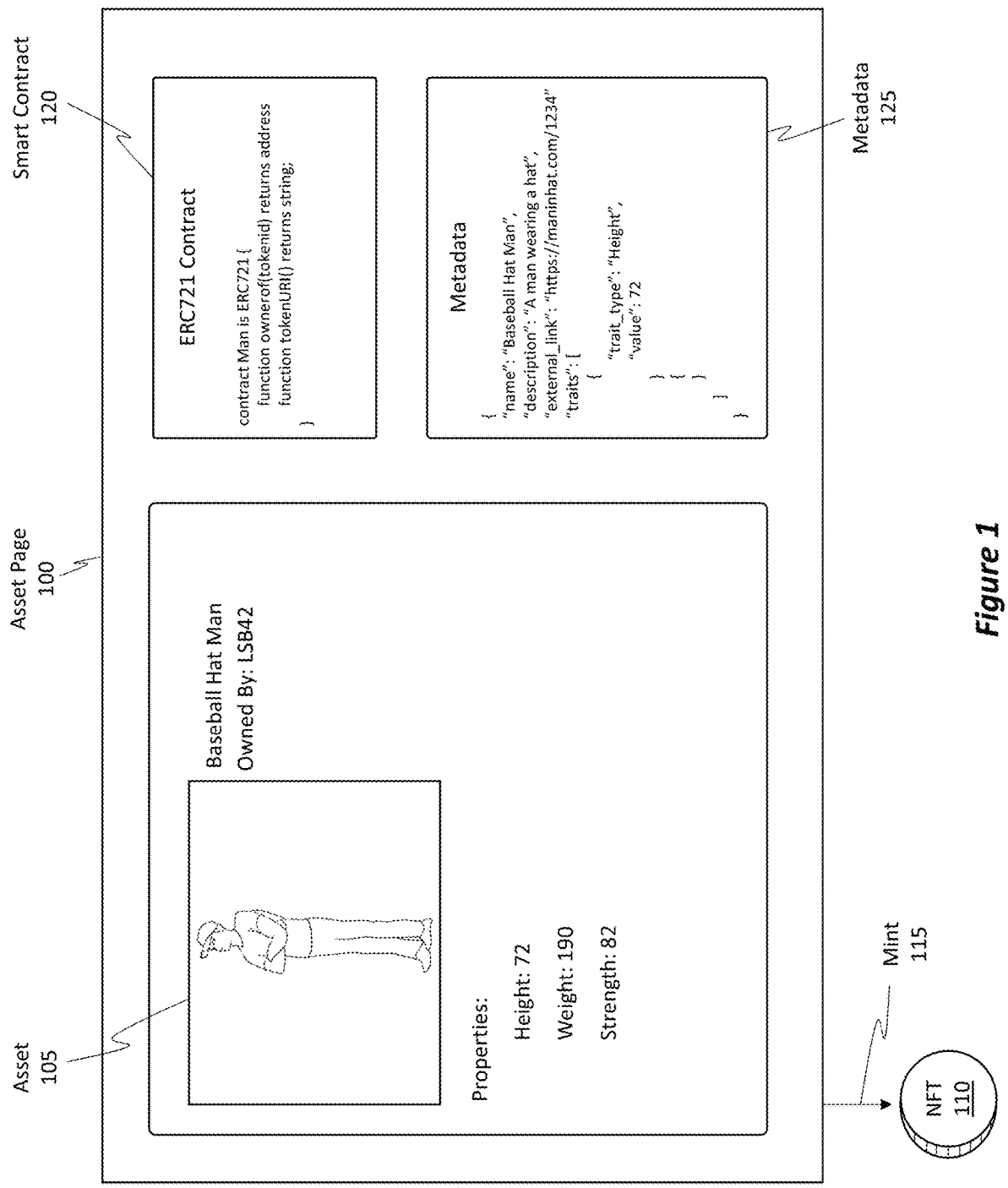
FIG. 1 illustrates an example of an asset page describing various characteristics of an asset and that asset's NFT.

Embodiments disclosed herein relate to systems, devices, and methods for authenticating a digital asset (aka "content") represented by a non-fungible token (NFT) that is stored in a blockchain.

Some embodiments identify an NFT that has been minted for an asset. The NFT was minted by (i) generating the NFT, which is generated in a manner so as to include a smart contract for the asset and (ii) generating metadata for the asset. In some cases, the NFT further includes an original hash of the asset. In some cases, the NFT includes a pointer pointing to the original hash of the asset. The NFT is stored in a decentralized blockchain, and the metadata is stored in a centralized repository. The original hash is stored in either the centralized repository or the decentralized blockchain (with the NFT).

The embodiments trigger a potential transfer of the NFT from a first owner to a second owner based on terms outlined in the smart contract. Triggering the potential transfer of the NFT from the first owner to the second owner includes downloading, from the centralized repository, a local version of the asset. The triggering process further includes generating a local hash of the local version of the asset. The local hash is generated using a same hashing process that was used to generate the original hash of the asset. The process further includes triggering a comparison between the local hash and the original hash.

In response to determining that the local hash matches the original hash, the embodiments facilitate transfer of the NFT from the first owner to the second owner. On the other hand, in response to determining that the local hash does not match the original hash, the embodiments facilitate termination of the potential transfer of the NFT. The embodiments also receive feedback that is associated with the potential transfer of the NFT from the first owner to the second owner. The feedback can be used for grading a trustworthiness of the various entities involved in the transaction and/or for grading the authenticity of the asset. Beneficially, the feedback for a specific NFT can be stored in a repository to provide historical data/feedback for that particular NFT. By doing so, a catalog, which manages information for the NFT, can show that a specific NFT is trustworthy (or not) using the historical data.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments beneficially improve the functionality of NFTs by providing a solution that enables confirmation of ownership of an NFT while also providing proof of content for an asset that is being purchased via an NFT. That is, by following the disclosed principles, the technical field of NFT generation and management is improved because the embodiments are able to provide robust techniques for authenticating that an asset, which is represented by an NFT, is the correct asset when the NFT is transferred to a new owner.

It has often been the case with NFT assets that a new purchaser is not 100% confident that what he/she is receiving is what was originally promised. In recent years, individuals and organizations have been hiring and relying on third-party data inspection specialists to verify whether a purchased asset is the original, actual asset that was promised during the transaction. This lack of confidence has arisen because the asset/content is typically stored separately from the NFT. Therefore, while the blockchain can be used to ensure the authenticity of the NFT, it has traditionally been the case that there was no initial authenticity provided to the asset represented by the NFT. The disclosed embodiments provide solutions to these deficiencies.

Additionally, it was typically the burden of an owner to ensure that an asset was properly protected. For instance, if an owner stored his/her digital asset on a single server, and that server died, then the asset might be lost forever, and the NFT would become worthless. One can imagine how data corruption or even hacking are also issues that plague owners of NFTs and assets. The disclosed embodiments relieve these pressure points by providing a robust data marketplace that is designed to store and safeguard digital assets.

In addition, based on interviews with multiple Chief Data Officers, it was discovered that a big challenge across numerous industries (including health, mining, digital marketing, tech-SW, pharmaceutical, retail, and finance) relates to trust regarding data acquisition, where brokers promise certain quality for data but where buyers receive a different level of quality for that data. As mentioned above, it has historically been the case that buyers hire a special entity for data strategy and acquisition so they can document the quality that comes from external resources and follow up with brokers when data is not as promised. The disclosed embodiments resolve this trust issue between the broker and the buyer while also reducing resources such as the need to hire data strategy and acquisition leads to hand hold this relationship.

In this regard, the embodiments provide improved data integrity and authenticity techniques to verify that an asset is what it should be. By providing these advantages, the embodiments can help reduce the substantial amount of resources and time that were previously required by third-party systems to verify authenticity. Accordingly, these and numerous other benefits will now be described in further detail throughout the remaining portions of this disclosure.

Minting an NFT for an Asset

Having just described some of the high level benefits provided by the disclosed embodiments, attention will now be directed to FIG. 1, which illustrates a so-called asset page 100 for an asset 105, which is shown to be an image of a man wearing a baseball hat. An NFT 110 has been minted (as shown by mint 115) for this asset 105. The minting process includes, among other things, generating a smart contract 120 and generating metadata 125. The smart contract 120 is a self-executing unit of code that facilitates a sale agreement by independently verifying whether certain specified terms and conditions are satisfied. The smart contract 120 is stored as a part of the NFT 110. As a consequence, both the smart contract 120 and the NFT 110 are stored in a blockchain. As a part of the minting process, an original owner of the asset 105 can specify the terms and conditions of the smart contract1 120.

The metadata 125 is also generated as a part of the minting process. The metadata 125 defines what the NFT 110 actually is. To illustrate, the metadata 125 can point to and/or describe the asset 105.

In contrast with the smart contract 120, which is stored in the blockchain, the metadata 125 is typically stored at a different location. The metadata 125 includes information describing the asset 105.

Figure 2:
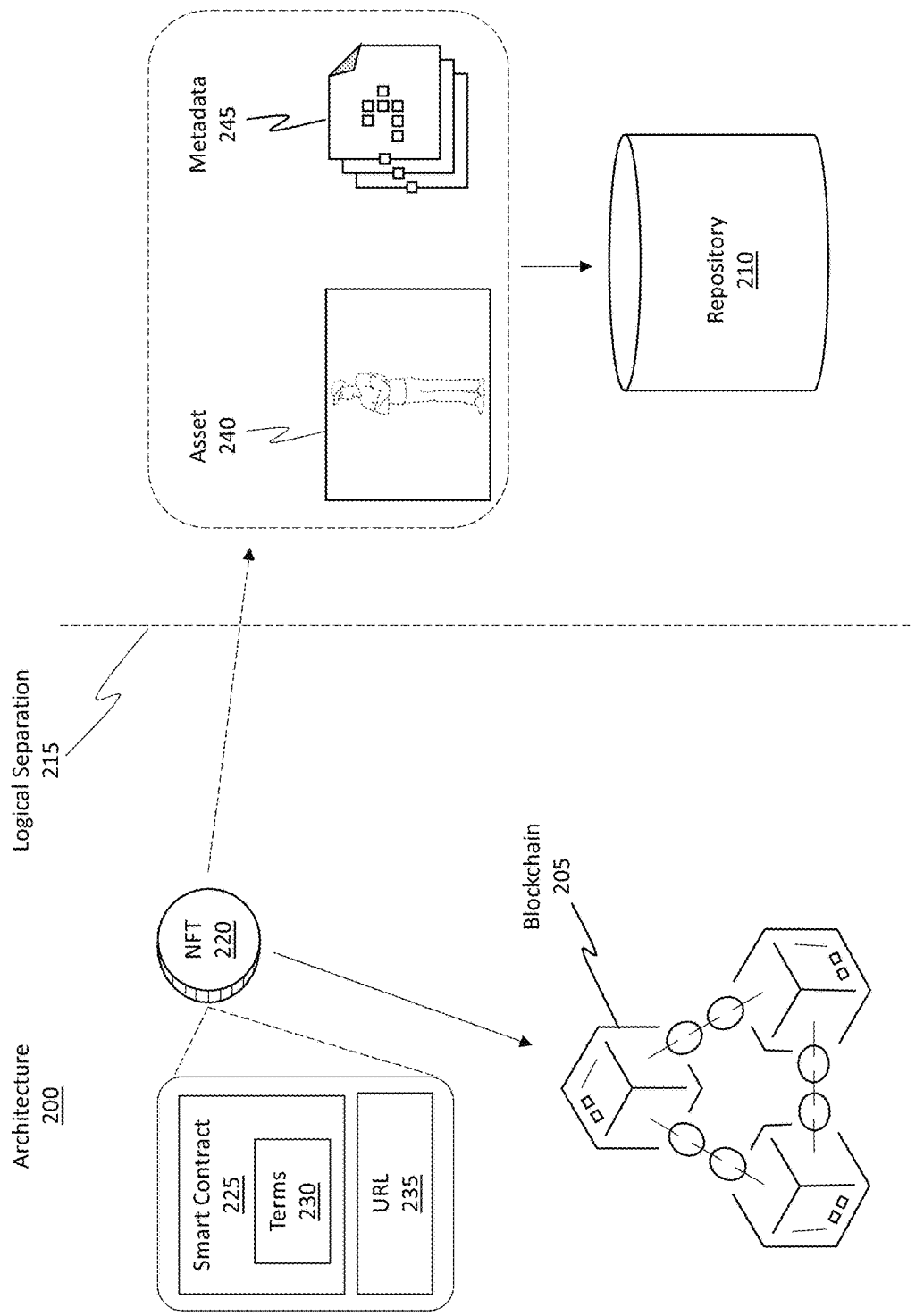
FIG. 2 illustrates an example architecture for implementing an NFT.

The NFT 110 provides a link (e.g., a URL) to the metadata 125. That is, the NFT 110 can link to externally located data (relative to the smart contract 120), thereby enabling the blockchain to reference information that is stored off of the blockchain as opposed to storing the data on the blockchain (which, as discussed previously, can be prohibitively expensive). Thus, the combination of the URL and the metadata 125 provides a balanced approach to using the blockchain (e.g., by storing a simple URL in the blockchain, where the URL points to the separately stored metadata) without overly burdening the blockchain with data. FIG. 2 provides some additional details.

FIG. 2 shows an architecture 200 that includes a decentralized blockchain 205 and a centralized repository 210. Notice, there is a logical separation 215 between the blockchain 205 and the repository 210.

An NFT 220 is stored in the blockchain 205. The NFT 220 includes a smart contract 225, which includes various terms 230 as to when the smart contract 225 is triggered. The NFT 220 further includes a URL 235.

An asset 240 and metadata 245 are shown as being stored in the repository 210. In some cases, the asset 240 and the metadata 245 are stored in the same repository while in other cases they are stored separately from one another. The URL 235 points to the metadata 245, and the metadata 245 describes or points to the asset 240.

Improved Architectures to Authenticate Assets

The disclosed embodiments are designed to beneficially eliminate the major challenges of the NFT for use in enterprise data ownership attribution as stated above. To do so, the embodiments provide a system of NFT generation with enterprise-class endpoints, provide file or data content for validation of digital content, provide an endpoint system of verification for certification of content, and provide a grading trust system for acquisition of data sets to build trust with the broker. Accordingly, FIGS. 3, 4, and 5 will now be discussed, where these figures provide various illustrations on architectures and process flows to achieve the disclosed benefits.

Figure 3:
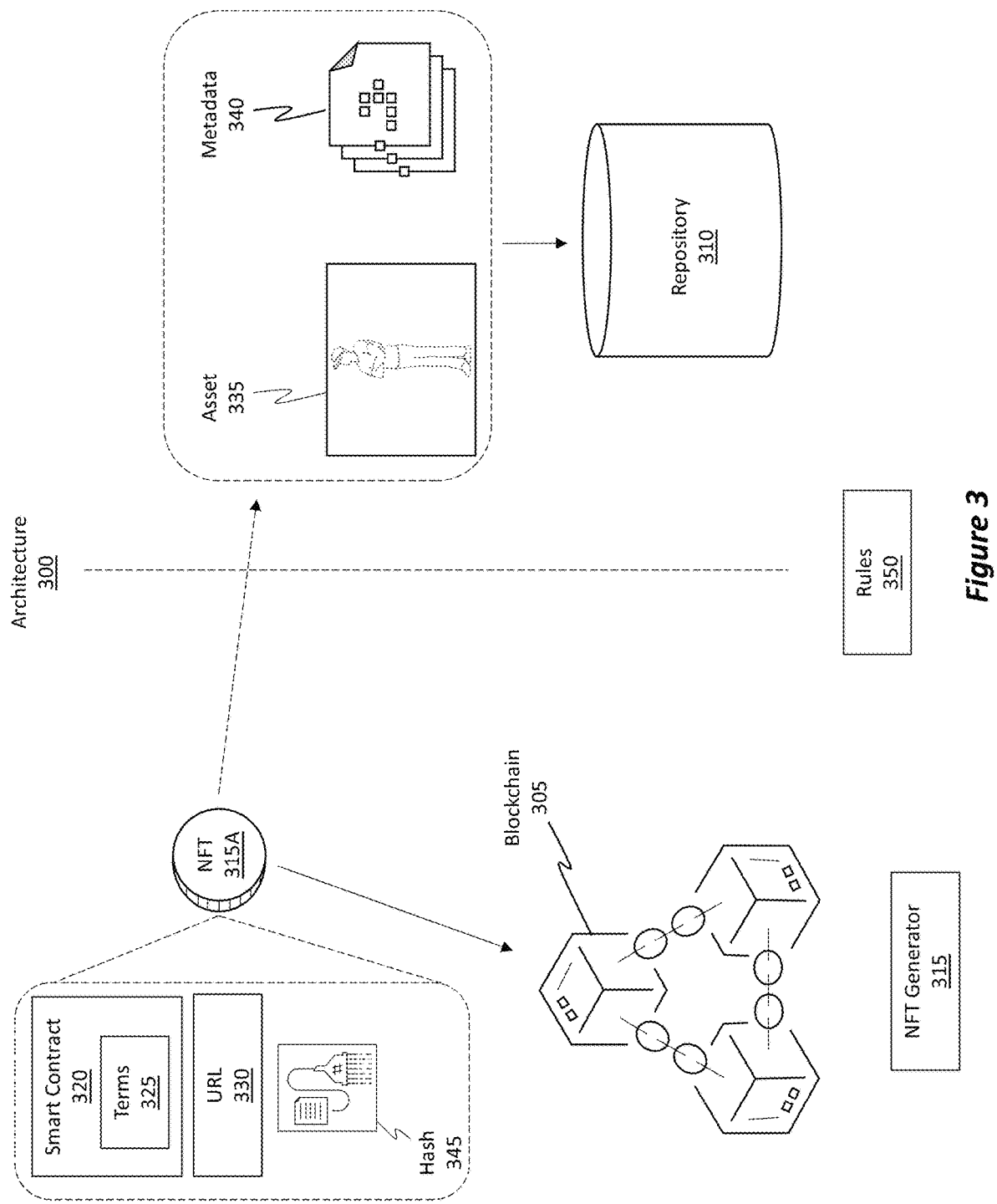
FIG. 3 illustrates an improved architecture for authenticating an asset represented by an NFT.

FIG. 3 shows an architecture 300 that is an improved version of the architecture 200 of FIG. 2. Architecture 300 is shown as including a blockchain 305 and a repository 310. The architecture 300 further includes an NFT generator 315, which is designed to generate an NFT 315A that includes a smart contract 320, which includes terms 325, and a URL 330. The NFT 315A represents an asset 335, which is stored in the repository 310. The asset 335 can be text data, image data, video data, audio data, or any other type of data.

The NFT generator 315 further generates the metadata 340 describing the asset 335. The URL 330 points to the metadata 340.

The NFT generator 315 is further configured to generate an original hash 345 of the asset 335 and to store that original hash 345 as a part of the NFT 315A. As will be discussed in more detail later, alternative embodiments store a pointer (to the original hash) in the NFT and store the original hash in the repository. Further details on this aspect will be provided later.

In this scenario, however, the NFT generator 315 has generated the original hash 345 of the asset 335. The NFT generator 315 further stores this hash 345 as a part of the NFT 315A in the blockchain 305.

The NFT generator 315 implements a hash function to generate the hash 345. A hash function is used to map or correlate any sized data to a unique, fixed-size value (i.e. a hash). Use of a hash allows one to determine whether two files are the same/identical, and this process can be performed without viewing the contents of the original data.

When the NFT 315A is generated, the embodiments also generate the hash 345 on the asset 335. This hash 345 can then subsequently be used to determine whether the delivered asset (i.e. the one a buyer receives) actually matches with the asset that was originally promised or that is actually represented by the NFT 315A. Further details on this aspect will be provided later.

FIG. 3 also shows a set of rules 350. In accordance with the disclosed principles, the embodiments are able to trigger when the NFT 315A is minted based on the rules 350. Stated differently, a time when the NFT 315A is minted can be based on a set of predefined rules 350 governing when NFTs are to be minted. In an example scenario, the predefined rules can include a rule stipulating that the NFT 315A is to be minted in response to a particular version of the asset 335 being generated. For instance, suppose the asset 335 is text data and further suppose the text data is research data generated by a research institution. The rules 350 can specify that the NFT 315A (or any number of subsequent NFTs) are to be generated when a particular version of the data is generated, such as perhaps a final version of the data.

In some cases, the predefined rules 350 can include a rule stipulating that the NFT 315A is to be minted in response to an identified event associated with the asset 335. As some examples, the event can be one or more of: an event where a final saved version of the asset is generated; or an event where an approved version of the asset is generated; or an event where an entity having a particular role authorizes the release of the asset.

In some cases, triggering when the NFT 315A for the asset 335 is to be minted is based on the set of predefined rules 350, where the predefined rules 350 include one or more of the following: a rule stipulating that the NFT for the asset is to be minted when the asset is registered using a particular type of registration; or a rule stipulating that the NFT for the asset is to be minted when the asset is registered by a specific entity (e.g., perhaps a supervisor or a person having a particular role); or a rule stipulating that the NFT for the asset is to be minted when the asset is stored in a specific storage location; or a rule stipulating that the NFT for the asset is to be minted when a filename for the asset is marked in a particular manner (e.g., the file might have a particular extension or text); or a rule stipulating that the NFT for the asset is to be minted at a particular time of day; or a rule stipulating that the NFT for the asset is to be minted when a state of the asset is a particular state (e.g., perhaps a final version or final state). Accordingly, the rules 350 can be used to trigger when the NFT 315A is generated. Furthermore, it may be the cases that the asset 335 undergoes multiple different versions, and it may then be the case that multiple different NFTs are generated.

Figure 4:
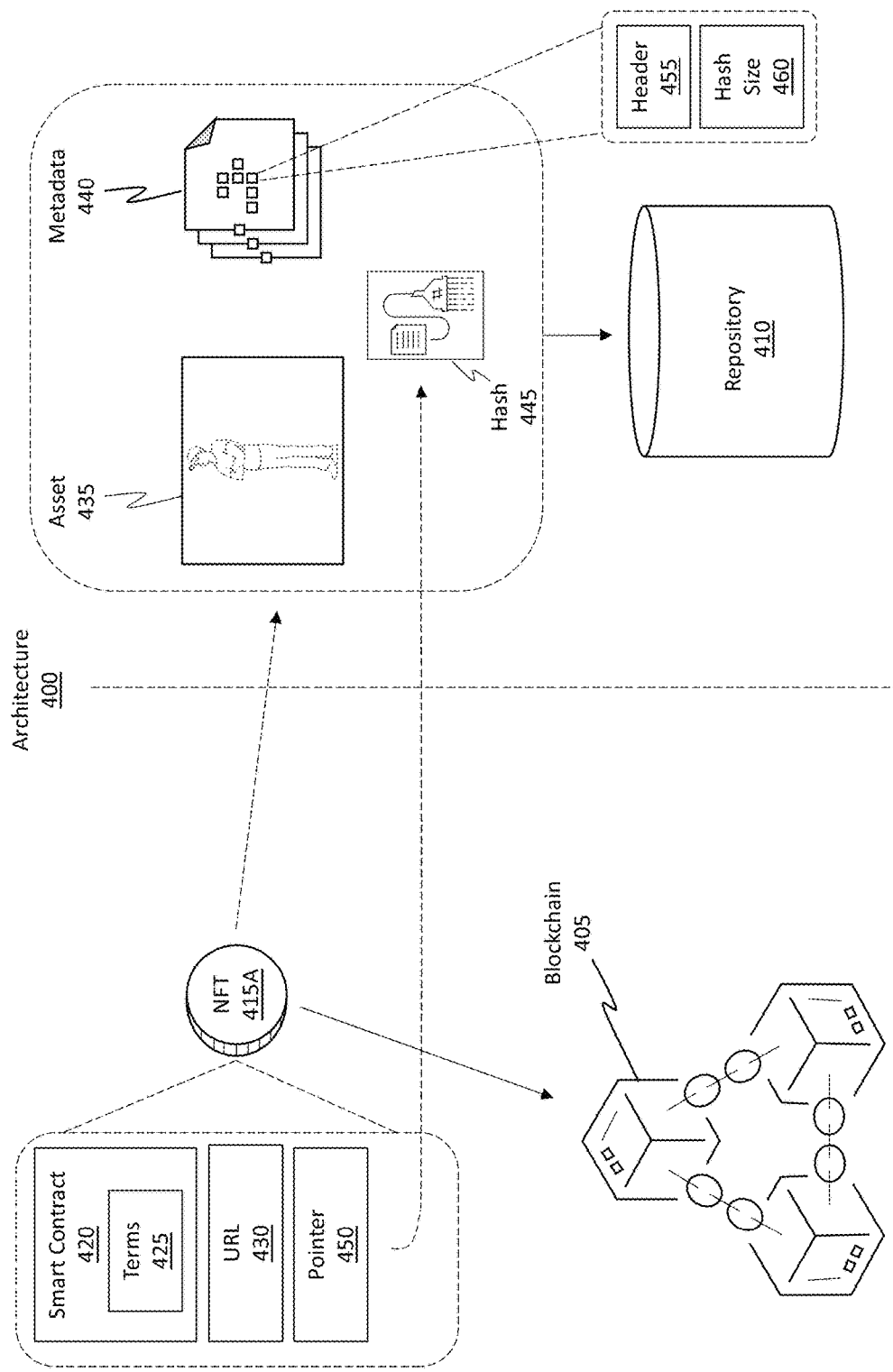
FIG. 4 illustrates an alternative architecture for authenticating the asset.

FIG. 4 shows an alternative scenario. In particular, architecture 400 of FIG. 4 is shown as including the blockchain 405, the repository 410, the NFT generator 415, the NFT 415A, the smart contract 420, the terms 425, the URL 430, the asset 435, and the metadata 440.

Here, the NFT generator 415 is configured to generate a hash 445 of the asset 435 and to store that hash 445 in the repository 410 as opposed to storing it in the blockchain 405. In this scenario, the NFT generator 415 generates a pointer 450 that points to the hash 445. The NFT generator 415 stores the pointer 450 as a part of the NFT 415A in the blockchain 405.

Notably, the hash 445 can be stored at the same storage location as the asset 435 and/or as the metadata 440. In some cases, the hash 445 can be stored as a part of the metadata 440, such as perhaps in the header 455 of the metadata 440. In some cases, the hash 445 is logically separate from the metadata 440, but both are stored in the repository 410. Optionally, the hash 445 can be stored at a different location relative to the metadata 440.

The hash size 460 of the hash 445 can be designed in various manners. In one example scenario, the hash size 460 of the hash 445 is designed to enable the hash 445 to be stored in the header 455 of the metadata 440 without causing undue storage burdens or errors on the metadata 440. In this case, the hash size 460 is typically limited to a threshold size. In other scenarios, the hash size 460 is not so limited.

It is typically the case that the size of the pointer 450 is relatively smaller than the size of the hash 445. Therefore, storing the pointer 450 in the blockchain 405 as opposed to storing the hash 445 in the blockchain 405 can provide storage benefits by decreasing the storage cost and complexity.

Example Transfer Process Flow

Figure 5:
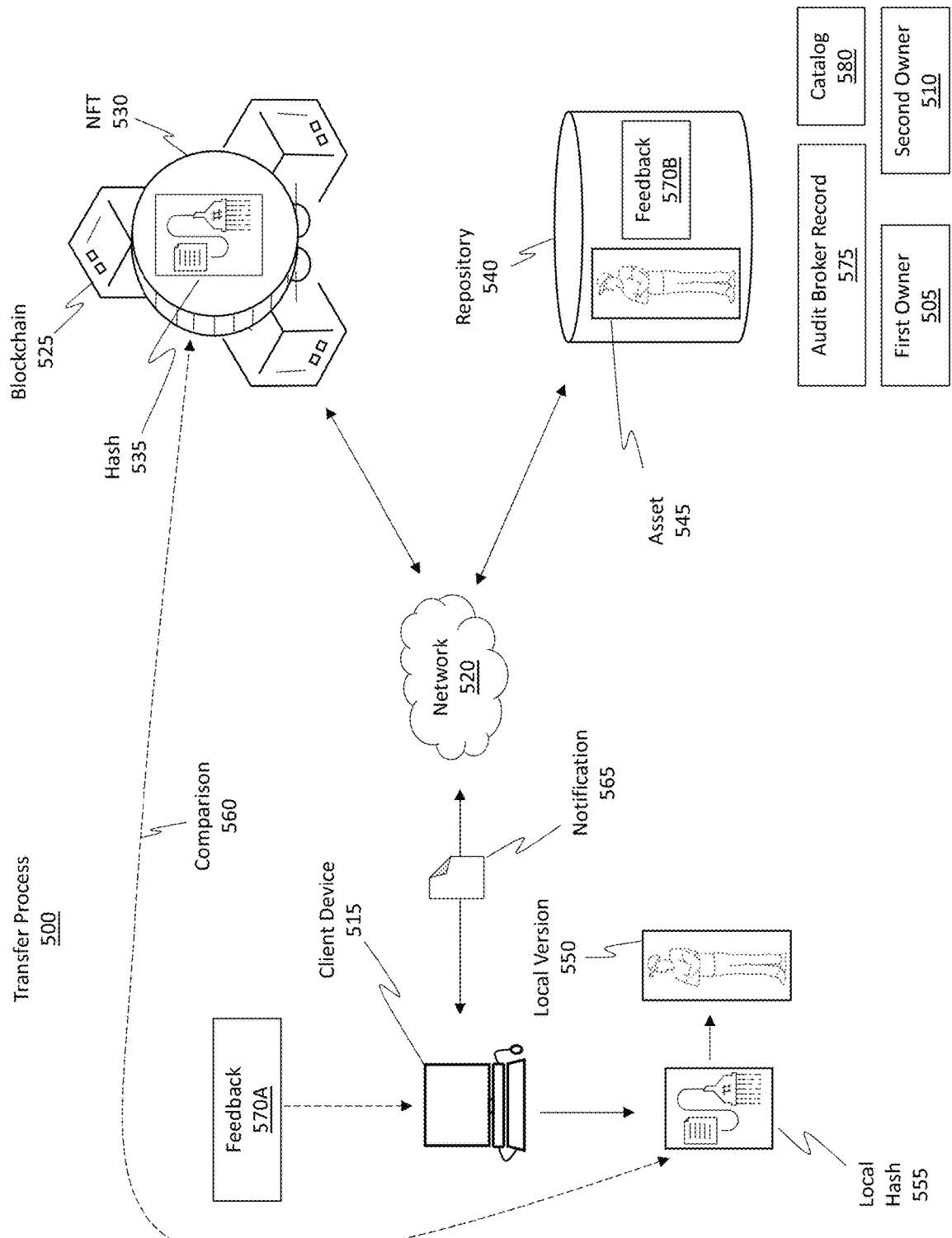
FIG. 5 illustrates an example transfer process for transferring ownership of an NFT from a first owner to a potential second owner.

Having just described various architectures in which the disclosed principles can be implemented, attention will now be directed to FIG. 5, which illustrates an example transfer process 500 that can be followed when transferring ownership of an NFT from a first owner to a second owner. The transfer process 500 can be implemented using the architecture 300 of FIG. 3 or the architecture 400 of FIG. 4.

In this examiner scenario, a first owner 505 (or a broker) would like to transfer an NFT to a second (prospective) owner 510. The second owner 510 has a client device 515 capable of communicating over a network 520 with a blockchain 525. As discussed previously, the blockchain 525 is storing an NFT 530 that optionally includes a hash 535 (or perhaps a pointer to a hash).

The client device 515 is also able to communicate over the network 520 with a repository 540 that includes an asset 545 and metadata (not shown). Optionally, the repository 540 might include the hash mentioned previously.

The NFT 530 includes a smart contract detailing terms and conditions that are to be satisfied in order to transfer ownership of the NFT 530 from the first owner 505 to the second owner 510.

In addition to the terms and conditions, the embodiments also implement additional operations that are to be performed in order to successfully transfer the ownership of the NFT 530. In particular, the embodiments cause the client device 515 to download a local version 550 of the asset 545. Then, a local hash 555 of the local version 550 is computed using a same hashing function as was used when the hash 535 was generated.

The embodiments then facilitate or perform a comparison 560 between the local hash 555 and the hash 535. In some cases, this comparison can be performed locally on the client device 515 by causing the client device 515 to download the hash 535 and then comparing the downloaded hash 535 to the local hash 555. In some cases, the comparison can be performed in the network 520, such as perhaps by a cloud service that receives both the local hash 555 and the hash 535.

If a result of the comparison 560 indicates that the two hashes are the same, then the transaction is permitted to continue, such as perhaps by transferring funds from the second owner 510 to the first owner 505 and by transferring ownership of the NFT 530 from the first owner 505 to the second owner 510. On the other hand, if the result of the comparison 560 indicates that the two hashes are not the same (i.e. what was received is not what was promised), then the transaction is not permitted to continue, such as by preventing the transfer of funds and preventing the transfer of ownership. In some cases, the downloaded asset can be discarded when the hashes do not match. In other cases, the downloaded asset can remain on the client device 515, and the asset can perhaps be watermarked or modified (e.g., perhaps its metadata) to indicate that it is not authentic.

In response to determining that the local hash 555 does not match the original hash 535, a notification 565 can be sent to one or more of: a creator of the asset 545, the first owner 505, a broker, or the second owner 510. The notification 565 can be sent from the client device 515 or perhaps from a cloud service that is monitoring and facilitating the operations.

Feedback 570A can be received, where the feedback 570A describes the transaction (whether it was a success or a failure). The feedback 570A can also include a grading or ranking for the transaction, for the first owner 505, for the second owner 510, for a broker, and/or for a quality level of the local version 550 of the asset. That is, in some cases, the feedback 570A can include a quality ranking of the asset, a reputation ranking of the first owner 505, a reputation ranking of the second owner 510, a reputation ranking of a broker, or the feedback 570A can include feedback provided by a third-party entity. Some embodiments store the feedback for a specific NFT in a repository to provide historical feedback data on this NFT. For instance, feedback 570B corresponds to the received feedback 570A. The feedback 570B can be stored in the repository 540, which is associated with the catalog 580. By doing so, a catalog (to be described momentarily) can show that a specific NFT is trustworthy (or not) using this historical data.

In some cases, the feedback provided by the third-party entity can operate as an added layer of authentication for the asset. As an example, the FDA or some other regulatory agency can optionally review publication data that is represented by an NFT, and the feedback from the regulatory agency can be used to grade the reputation of the various entities and/or data. Additionally, the feedback 570A can optionally be provided from one or more of the first owner 505 or the second owner 510.

In some cases, an audit broker record 575 can be maintained to detect patterns of data hash failures. This audit broker record 575 can be used to determine whether intentional or perhaps unintentional fraud is suspect or is repeatedly evidenced from an owner of an NFT or a broker who manages NFTs. That is, each owner of an NFT (and/or broker manager) can have audit broker records associated with that owner, and potential buyers of NFTs can review an owner's records (or broker's records) to determine whether that owner is trustworthy. In some implementations, the audit broker record 575 includes information detailing whether the local hash 555 matches the original hash 535 and can optionally include additional information, such as a number of attempted purchases or transactions for a NFT. Buyers may become suspicious of an asset of that asset's NFT has attempted, but failed, to be sold a threshold number of times.

In some cases, the centralized repository 540 can include a catalog 580 identifying NFTs and corresponding assets. For instance, the NFT 530 and the asset 545 can be listed in the catalog 580 as well as any number of additional NFTs and assets. The catalog 580 can be used to search and review assets for potential purchase by interested buyers. The catalog can also be provided to enable others to review and submit feedback on assets. The feedback 570A can be stored in a repository of the catalog 580 so the feedback 570A can be used to show a historical grading of a particular NFT. Accordingly, the embodiments can use the disclosed architectures to facilitate a transfer of an NFT from one entity to another entity.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
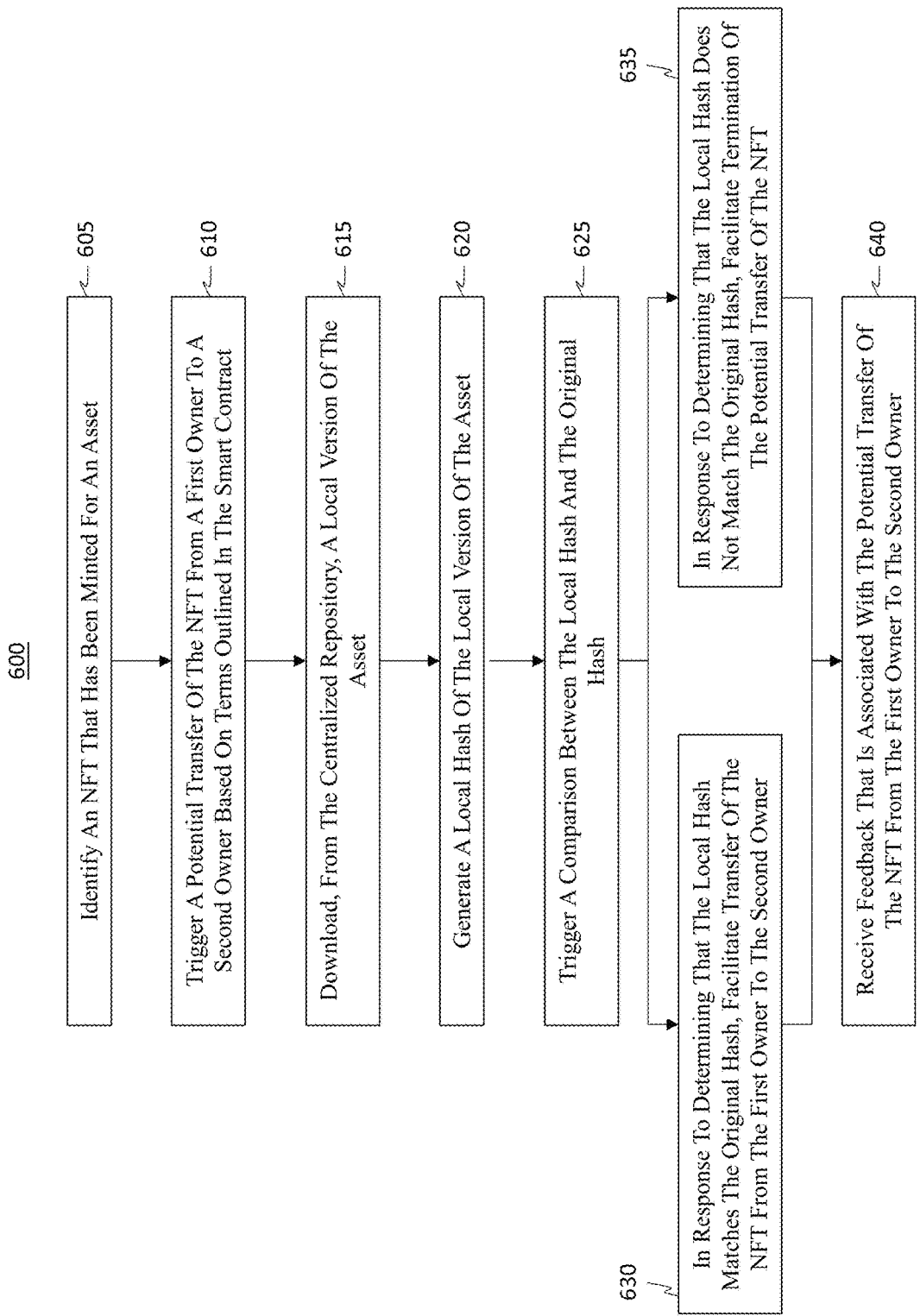
FIG. 6 illustrates a flowchart of an example method for authenticating a digital asset.

Attention will now be directed to FIG. 6, which illustrates a flowchart of an example method 600 for authenticating a digital asset represented by a non-fungible token (NFT) that is stored in a blockchain. Method 600 can be implemented within the architectures mentioned herein. In some cases, method 600 can be implemented by the client device 515 of FIG. 5 or, alternatively, by a cloud service operating in the network 520.

Method 600 includes an act (act 605) of identifying an NFT that has been minted for an asset. The NFT was minted by generating the NFT, which is generated in a manner so as to include a smart contract for the asset. In some cases, the NFT is further minted to include at least one of an original hash of the asset or a pointer pointing to the original hash of the asset. That is, the minting process includes generating the original hash of the asset and further generating metadata for the asset.

The NFT is stored in a decentralized blockchain. The original hash can be stored either as a part of the NFT in the decentralized blockchain or, alternatively, in a centralized repository. The metadata is stored in the centralized repository. If the pointer is generated, then the pointer is stored in the blockchain and points to the original hash, which is stored in the centralized repository. Optionally, the original hash can be stored in a header of the metadata in the centralized repository. If that is the case, then the size of the original hash can be designed to enable the original hash to be stored in the header without causing errors to the metadata. Accordingly, the original hash can be stored in either the centralized repository or the decentralized blockchain.

Additional information is included in the NFT when it is minted. For instance, the NFT can further include a URL pointing to the metadata stored in the centralized repository. Notably, the URL can be configured to be immutable.

Act 610 includes triggering a potential transfer of the NFT from a first owner to a second owner. In some cases, the transfer is facilitated by a broker of NFTs. In any event, this potential transfer is based on terms outlined in the smart contract. The potential transfer of the NFT from the first owner to the second owner includes a number of actions.

To illustrate, act 615 includes downloading, from the centralized repository, a local version of the asset. Act 620 includes generating a local hash of the local version of the asset. The local hash is generated using a same hashing process that was used to generate the original hash of the asset. Act 625 includes triggering a comparison between the local hash and the original hash.

In response to determining that the local hash matches (e.g., exactly matches) the original hash, act 630 includes facilitating a transfer of the NFT from the first owner to the second owner. On the other hand, in response to determining that the local hash does not match the original hash, act 635 includes facilitating termination of the potential transfer of the NFT.

Act 640 includes receiving feedback that is associated with the potential transfer of the NFT from the first owner to the second owner. The feedback can be grading or ranking feedback describing how the transfer was performed. This feedback can be used to rank individuals, brokers, the transfer process, the data marketplace features, and/or even the quality of the underlying data. Subsequent users can refer to the feedback or grading to determine whether they would like to purchase an NFT from a seller or via the marketplace. Sellers with positive feedback or positive rankings can be considered to be more trustworthy than sellers with negative feedback. As described in FIG. 5, the feedback can be stored in the repository that is managed by the catalog. Viewers of the catalog can then review the stored feedback as well.

Specific Use Case Scenario

A specific use case example will be helpful. One will appreciate how this use case is provided for example purposes only and should not be viewed as being limiting or binding in any manner.

Employees at a pharmaceutical company often create massive quantities of data. It is often the case that, when a state of the data has changed in a project, the employees may want to share that data with third party entities (e.g., reviewers, other labs, etc.). This scenario, therefore, is one where an entity is desirous to provide trial data to an organization or review authority (e.g., perhaps the FDA). The embodiments can be used to ensure the authenticity of that data.

The disclosed embodiments are configured to detect file changes and state changes within file content. In other implementations, the embodiments can operate a website that enables file upload or an embedded hardware solution that monitors shared file storage. The embodiments use a set of predefined rules to determine which files, folders, or devices and which state changes to use to register content with an NFT (i.e. to trigger when an NFT for that content is to occur).

Examples of rules include, but are in no way limited to, the following: always register files having certain extensions, such as *.doc, *.psd, *.pdf, *.WZYWIG etc.; always register files from specific users; always register files in a specified storage location; when registering a file, make a copy in the secure location that the NFT will eventually point to; trigger based on a time of day; trigger based on file status changes (e.g., *.doc is marked as Official); trigger when state changes occur; or any combination thereof. Optionally, the rules can be stored in an NFT datastore or marketplace for reference and recovery purposes.

The company will also determine which level of hash/checksum it would like to use for file validation for the files which are registered for subsequent NFT generation. The embodiments can elect to store the hash that is generated in the metadata of the NFT upon creation of the NFT or to store the hash in a datastore, repository, or marketplace. If the hash is stored in the repository, then a pointer to the hash is stored in the NFT's metadata.

On the end user's device, the embodiments detect an event that meets the rules (e.g., such as perhaps a saved pdf file has its name modified to include the following term: "official"). Based on the rules being implemented, the embodiments then trigger the generation of the NFT, which includes generating a hash of the pdf file (i.e. the asset). The hash is stored either as a part of the NFT itself or in the repository. The NFT is stored in the blockchain, and the asset is stored in the secure marketplace along with the NFT's metadata.

In this use case, a record of the asset and NFT can also be included in a catalog. Based on security settings, this catalog may be visible to external entities relative to the company. For instance, the catalog may be visible to a reviewing entity, such as the FDA. Once the catalog is linked with the data, the data may be found or requested by a third party via use of the catalog. The catalog can be used to certify ownership and authenticity of the data. For instance, a third party entity can use the catalog to access the NFT and asset. The third party can optionally download the data (i.e. the asset, in this case the pdf file) to review the data for authenticity and accuracy.

As a part of a download, a local hash is generated on the downloaded data. The embodiments perform a comparison to determine whether the resulting local hash matches the original hash stored in the NFT metadata or otherwise referenced. If the hashes match, it means the data is valid and secure, or at least means that the data is what it is supposed to be at the time of NFT generation.

If the hashes do not match, it is an indication that the downloaded data does not match the data referenced at the point of NFT generation. Notifications can be sent regarding this scenario. For instance, the broker of the transaction can receive the notification of the comparison results. If the results are negative or "failed match," notifications can also be sent to a creator, the broker, and/or any other accessor of the data. If the results are positive, payment can be processed.

The result is stored in the audit broker record. The existence of the audit broker record gives the embodiments a mechanism to identify trends of data issues, data access, and can further be used to proactively address any potential corruption or error issues.

In addition, data sets that are curated and trustable by the broker can be identified using a set of tests and grading (e.g., perhaps a 1-5 star grading system). Data sets will be entered into the broker data marketplace. In this way, when a buyer desires to buy a data set, the buyer can refer to the grading system to know whether he/she is buying from a trustworthy source. Comments or feedback from other sources can be included in the grading system.

Accordingly, the disclosed embodiments provide an automated chain of events leading to increased validation capabilities of NFT-registered digital assets. The embodiments also provide for the automated expansion of NFT metadata to include a hash or a hash pointer. The embodiments also enable the use of NFT metadata to provide third-party validation of the data to facilitate decision making on the basis of a trust or grading system.

The embodiments further enable the use of an audit broker record to detect patterns of data hash failure to determine intentional or unintentional fraud or security risks. Even further, the embodiments use the grading system to grade the trust level of data to ensure the same expectation of quality between what a broker promises and what the buyer expects or actually receives.

Example Architectures and Computer Systems

The following is a discussion of aspects of example operating environments for various embodiments of the invention. This discussion is not intended to limit the scope of the invention, or the applicability of the embodiments, in any way. One will appreciate how the disclosed operations can be performed using these operating environments.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients.

Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term "data" or "network packet" is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Figure 7:
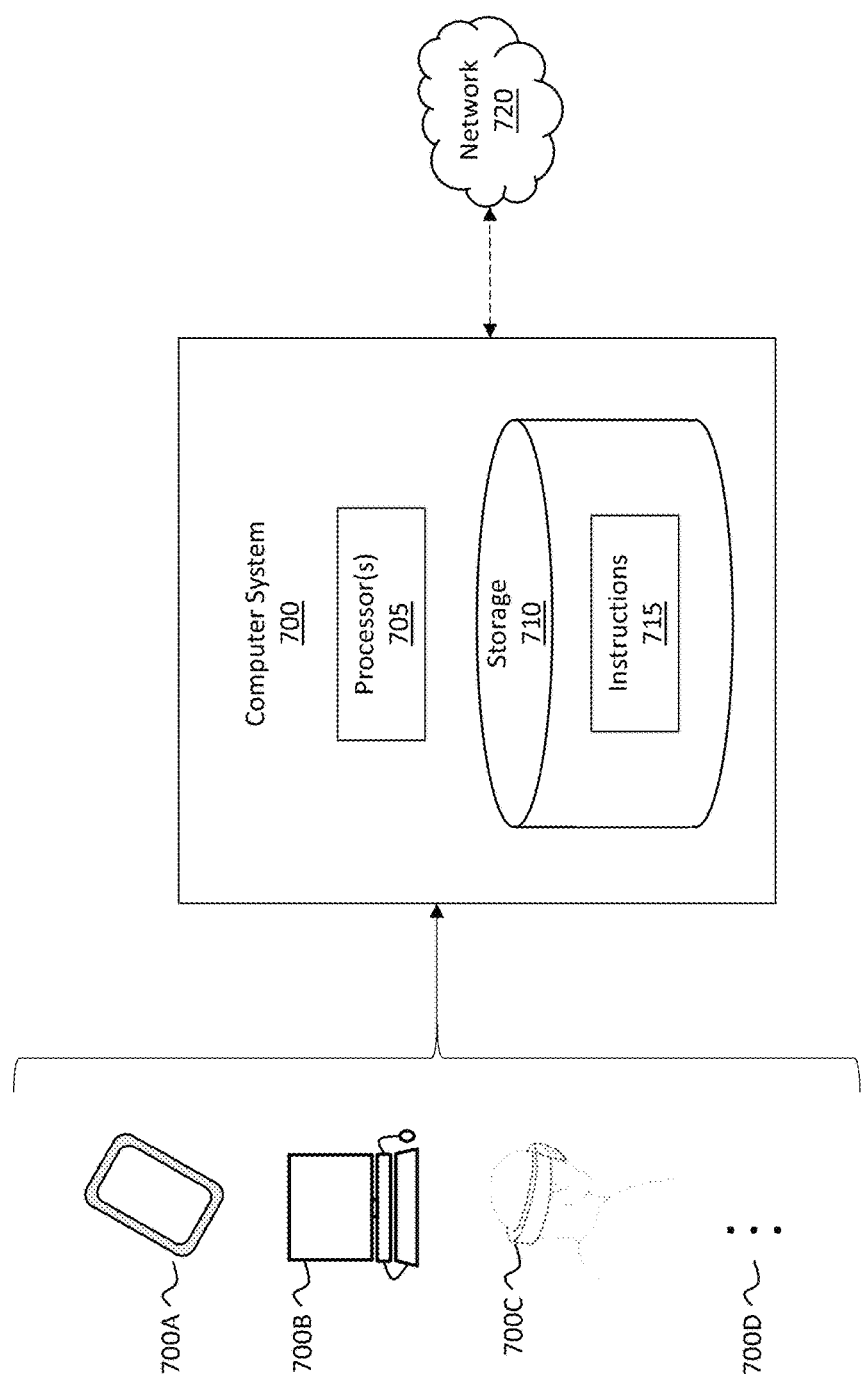
FIG. 7 illustrates an example computer system that can be configured to perform any of the disclosed operations.

With particular attention now to FIG. 7, one example of a computer system 700 is disclosed. Computer system 700 may include and/or be used to perform any of the operations described herein, including method 600 of FIG. 6. Computer system 700 may take various different forms. For example, computer system 700 may be embodied as a tablet 700A, a desktop or a laptop 700B, a wearable device 700C, a mobile device, or any other standalone device, as represented by the ellipsis 700D. Computer system 700 may also be a distributed system that includes one or more connected computing components/devices that are in communication with computer system 700.

In its most basic configuration, computer system 700 includes various different components. FIG. 7 shows that computer system 700 includes one or more processor(s) 705 (aka a "hardware processing unit") and storage 710.

Regarding the processor(s) 705, it will be appreciated that the functionality described herein can be performed, at least in part, by one or more hardware logic components (e.g., the processor(s) 705). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 700. The different components, modules, engines, and services described herein may be implemented as objects or processors that execute on computer system 700 (e.g. as separate threads).

Storage 710 may be physical system memory, which may be volatile, non-volatile, or some combination of the two. The term "memory" may also be used herein to refer to non-volatile mass storage such as physical storage media. If computer system 700 is distributed, the processing, memory, and/or storage capability may be distributed as well.

Storage 710 is shown as including executable instructions 715. The executable instructions 715 represent instructions that are executable by the processor(s) 705 of computer system 700 to perform the disclosed operations, such as those described in the various methods.

The disclosed embodiments may comprise or utilize a special-purpose or general-purpose computer including computer hardware, such as, for example, one or more processors (such as processor(s) 705) and system memory (such as storage 710), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 700 may also be connected (via a wired or wireless connection) to external sensors (e.g., one or more remote cameras) or devices via a network 720. For example, computer system 700 can communicate with any number devices or cloud services to obtain or process data. In some cases, network 720 may itself be a cloud network. Furthermore, computer system 700 may also be connected through one or more wired or wireless networks to remote/separate computer systems(s) that are configured to perform any of the processing described with regard to computer system 700.

A "network," like network 720, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 700 will include one or more communication channels that are used to communicate with the network 720. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for authenticating a digital asset represented by a non-fungible token (NFT) that is stored in a blockchain, said method comprising:
    identifying an NFT that has been minted for an asset, wherein the NFT includes a smart contract for the asset and an original hash of the asset, wherein the NFT is associated with metadata for the asset, wherein the NFT is stored in a decentralized blockchain, and the metadata is stored in a centralized repository;
    triggering a potential transfer of the NFT from a first owner to a second owner based on terms outlined in the smart contract, wherein triggering the potential transfer of the NFT from the first owner to the second owner includes:
        downloading, from the centralized repository, a local version of the asset;
        generating a local hash of the local version of the asset, wherein the local hash is generated using a same hashing process that was used to generate the original hash of the asset;
        triggering a comparison between the local hash and the original hash;
        in response to determining that the local hash matches the original hash, facilitating transfer of the NFT from the first owner to the second owner; and
        in response to determining that the local hash does not match the original hash, facilitating termination of the potential transfer of the NFT;
    receiving feedback that is associated with the potential transfer of the NFT from the first owner to the second owner;
    ranking a reputation of the first owner, a reputation of the second owner, and/or how the transfer was performed based on the feedback; and
    storing the feedback and rankings in the centralized repository and providing access to the feedback and rankings to subsequent potential owners.

2. The method of claim 1, further comprising including a quality ranking of the asset in the feedback.

3. The method of claim 1, wherein the feedback is provided by a third party.

4. The method of claim 1, wherein the asset includes at least one of: text data, image data, video data, or audio data.

5. The method of claim 4, wherein the asset is the text data, and wherein the text data is research data generated by a research institution.

6. The method of claim 1, wherein the NFT is minted based on a set of predefined rules.

7. The method of claim 6, wherein the predefined rules include a rule stipulating that the NFT is to be minted in response to a particular version of the asset.

8. The method of claim 6, wherein the predefined rules include a rule stipulating that the NFT is to be minted in response to an identified event associated with the asset.

9. The method of claim 8, wherein the event is one or more of: generating a final saved version of the asset; generating an approved version of the asset; or authorizing release of the asset by an entity having a particular role.

10. The method of claim 1, wherein the feedback includes feedback provided by a third-party entity, and wherein the feedback provided by the third-party entity operates as an added layer of authentication for the asset.

11. A method for authenticating a digital asset represented by a non-fungible token (NFT) that is stored in a blockchain, said method comprising:
    identifying an NFT that has been minted for an asset, wherein the NFT includes a smart contract for the asset and a pointer pointing to an original hash of the asset, is associated with the original hash of the asset, and is associated with metadata for the asset, wherein the NFT is stored in a decentralized blockchain, and the original hash and the metadata are stored in a centralized repository, and wherein the pointer in the blockchain points to the original hash that is stored in the centralized repository;
    triggering a potential transfer of the NFT from a first owner to a second owner based on terms outlined in the smart contract, wherein the potential transfer of the NFT from the first owner to the second owner includes:
        downloading, from the centralized repository, a local version of the asset;
        generating a local hash of the local version of the asset, wherein the local hash is generated using a same hashing process that was used to generate the original hash of the asset;
        triggering a comparison between the local hash and the original hash;
        in response to determining that the local hash matches the original hash, facilitating transfer of the NFT from the first owner to the second owner; and
        in response to determining that the local hash does not match the original hash, facilitating termination of the potential transfer of the NFT; and
    receiving feedback that is associated with the potential transfer of the NFT from the first owner to the second owner; and
    maintaining an audit broker record to detect patterns of data hash failure to determine fraud, wherein the audit broker record includes information detailing whether the local hash matches the original hash, and wherein the audit broker record, including the information detailing whether the local hash matches the original hash, is available for the second owner to review as part of the potential transfer of the NFT.

12. The method of claim 11, further comprising receiving the feedback from one or more of the first owner or the second owner.

13. The method of claim 11, wherein the NFT further includes a universal resource locator (URL) pointing to the metadata stored in the centralized repository, and wherein the URL is immutable.

14. The method of claim 11, wherein the NFT is minted based on a set of predefined rules, and wherein the predefined rules include one or more of the following:
- a rule stipulating that the NFT for the asset is minted when the asset is registered using a particular type of registration; or
- a rule stipulating that the NFT for the asset is minted when the asset is registered by a specific entity; or
- a rule stipulating that the NFT for the asset is minted when the asset is stored in a specific storage location; or
- a rule stipulating that the NFT for the asset is minted when a filename for the asset is marked in a particular manner; or
- a rule stipulating that the NFT for the asset is minted at a particular time of day; or
- a rule stipulating that the NFT for the asset is minted when a state of the asset is a particular state.

15. A method for authenticating a digital asset represented by a non-fungible token (NFT) that is stored in a blockchain, said method comprising:
- identifying an NFT that has been minted for an asset, wherein the NFT includes a smart contract for the asset, wherein the NFT is associated with an original hash of the asset, and metadata for the asset, wherein the NFT is stored in a decentralized blockchain, and the metadata is stored in a centralized repository, and wherein the original hash is stored in either the centralized repository or the decentralized blockchain;
- triggering a potential transfer of the NFT from a first owner to a second owner based on terms outlined in the smart contract, wherein the potential transfer of the NFT from the first owner to the second owner includes:
- downloading, from the centralized repository, a local version of the asset;
- generating a local hash of the local version of the asset, wherein the local hash is generated using a same hashing process that was used to generate the original hash of the asset;
- triggering a comparison between the local hash and the original hash;
- in response to determining that the local hash matches the original hash, facilitating transfer of the NFT from the first owner to the second owner; and
- in response to determining that the local hash does not match the original hash, facilitating termination of the potential transfer of the NFT;
- receiving feedback that is associated with the potential transfer of the NFT from the first owner to the second owner;
- maintaining a catalog at the centralized repository, wherein maintaining the catalog comprises:
- listing NFTs including the NFT in the catalog;
- storing the feedback in the catalog; and
- providing access to the catalog to subsequent potential owners for review of the listing of NFTs and feedback; and
- determining whether fraud is suspected for the NFTs based on the received feedback.

16. The method of claim 15, wherein a header of the original hash includes the metadata.

17. The method of claim 15, wherein, in response to determining that the local hash does not match the original hash, a notification is sent to one or more of: a creator of the asset, the first owner, or the second owner.

18. The method of claim 15, wherein a size of the original hash is designed to enable the original hash to be stored in a header of the metadata.

* * * * *